(No Model.) 2 Sheets—Sheet 1.

J. A. KENDALL.
FLUID DRAWING AND MEASURING DEVICE.

No. 384,766. Patented June 19, 1888.

WITNESSES:
D. C. Reusch
E. M. Clark

INVENTOR:
J. A. Kendall
BY Munn & Co
ATTORNEYS.

(No Model.) 2 Sheets—Sheet 2.
J. A. KENDALL.
FLUID DRAWING AND MEASURING DEVICE.
No. 384,766. Patented June 19, 1888.
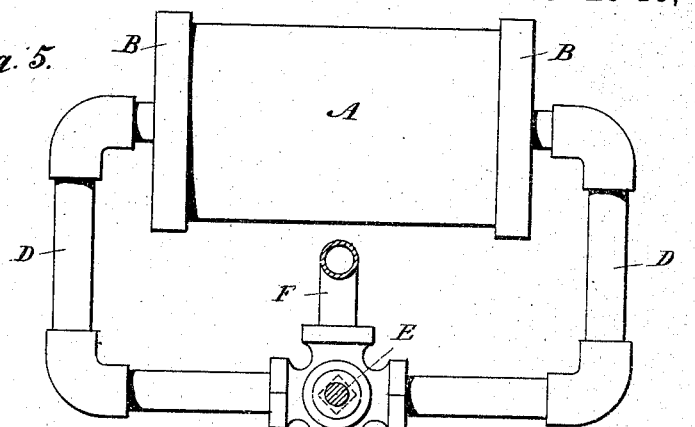
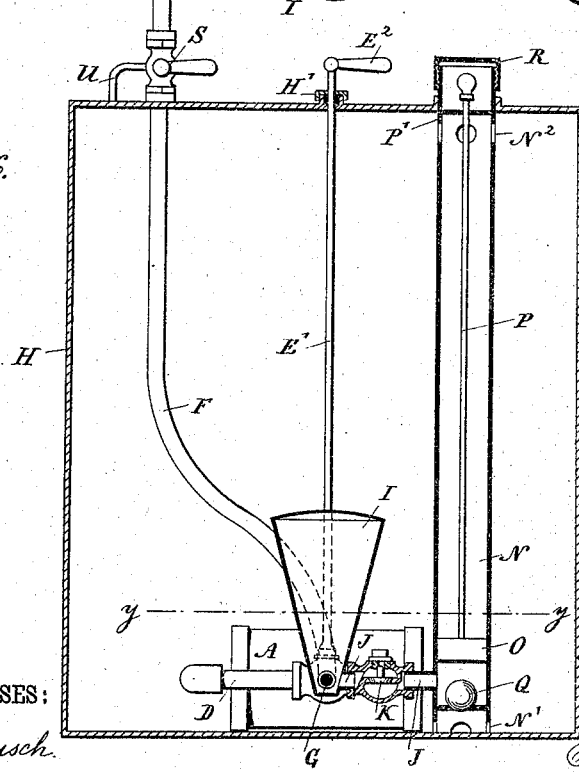
WITNESSES:
D. C. Reusch.
E. M. Clark.
INVENTOR:
J. A. Kendall.
BY Munn & Co.
ATTORNEYS.

UNITED STATES PATENT OFFICE.

JOHN A. KENDALL, OF MAYSVILLE, MISSOURI.

FLUID DRAWING AND MEASURING DEVICE.

SPECIFICATION forming part of Letters Patent No. 384,766, dated June 19, 1888.

Application filed July 26, 1887. Serial No. 245,356. (No model.)

*To all whom it may concern:*

Be it known that I, JOHN A. KENDALL, of Maysville, in the county of De Kalb and State of Missouri, have invented a new and Improved Fluid Drawing and Measuring Device, of which the following is a full, clear, and exact description.

The object of my invention is to provide a new and improved device for automatically drawing and measuring fluids—such as coal-oil, gasoline, &c.—from vessels.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
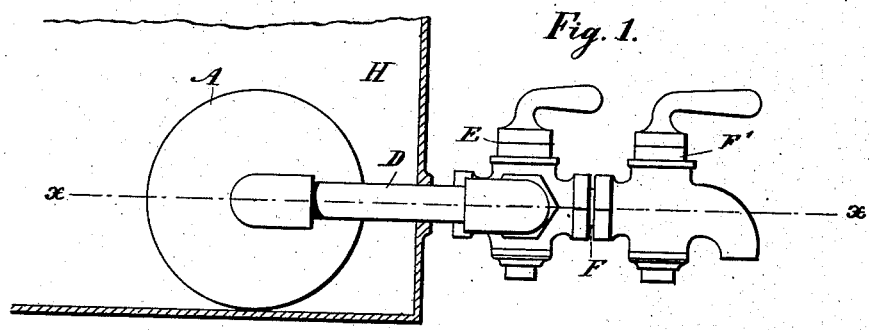
Figure 2:
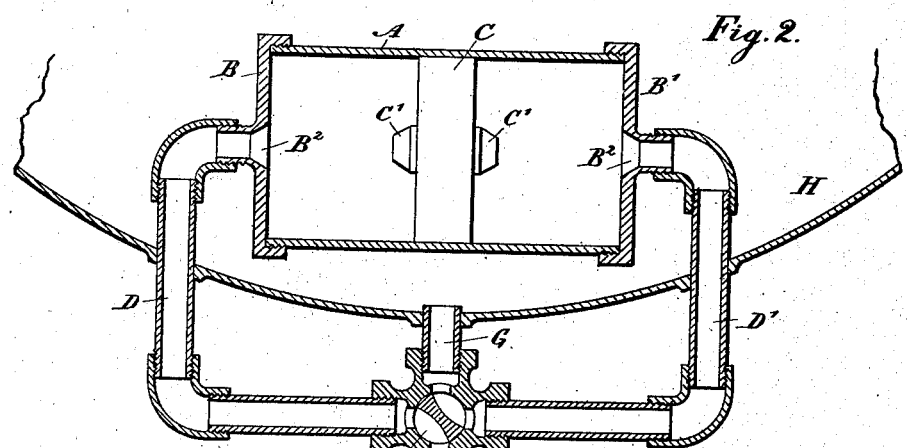
Figure 3:
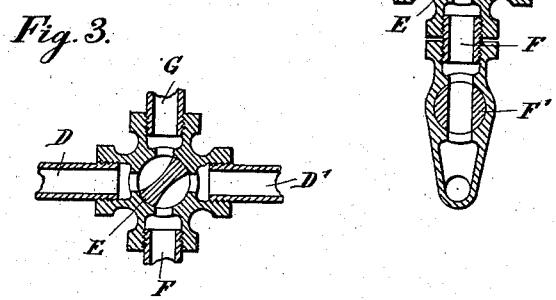
Figure 4:
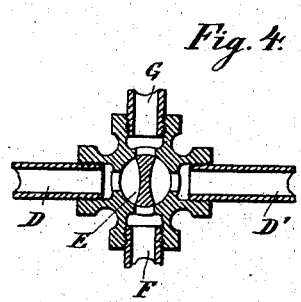

Figure 1 is a side elevation of my improvement as applied. Fig. 2 is a sectional plan view of the same on the line $x\,x$ of Fig. 1. Figs. 3 and 4 are plan views of the four-way cock in different positions. Fig. 5 is a sectional plan view of my improvement in connection with the pump on the line $y\,y$ of Fig. 6. Fig. 6 is a sectional front elevation of the same on the line $z\,z$ of Fig. 5; and Figs. 7, 8, and 9 are plan views of the three-way discharge-cock in different positions.

My improvement is provided with a measuring-cylinder, A, of suitable size, and provided at its ends with the heads B and B', each having in its center a seat, $B^2$. In the cylinder A is held to slide the piston C, provided in its center, on each side, with a fixed valve, C', adapted to fit into the corresponding seat, $B^2$, in the head B or B'. The seats $B^2$ in the heads B and B' connect, respectively, with the pipes D and D', leading at opposite sides to the four-way cock E, provided with the discharge-pipe F and the inlet-pipe G, connected with the tank H, containing the fluid to be withdrawn and measured. The pipes F and G enter the four-way cock E at right angles to the pipe D and D'. The discharge F is provided with a valve, F'.

The operation is as follows: The measuring-cylinder A is placed in the bottom of the tank or vessel H and its connecting-pipes D and D' passed through the sides of the tank or vessel H, connected on the outside with the four-way cock E, as above described. Now, when the operator desires to withdraw and measure a certain quantity of the liquid, supposing the piston C to be located at the head B, then, to draw a measure, turn the valve of the four-way cock to the position indicated in Fig. 3 and open the valve F'. Then the fluid will flow into the cylinder at $B^2$ through head B, forcing the piston to the opposite end and seating the valve C' in the seat $B^2$ of head B', when the flow ceases. Then to repeat the measure all that is needful is to turn valve of the four-way cock to the position connecting the inlet-pipe G with the connecting-pipe D', and the flow will again take place and the contents of cylinder A delivered. The piston always remains at the end at which it is located when the valve F' is closed, and the cylinder is filled with fluid at one end as rapidly as the same is discharged at the other.

As illustrated in Figs. 5 and 6, I provide my improvement with a pump, so as to force the measured liquid out of the tank into convenient receptacles. In this case I connect the pipe G with the reservoir I, located in the tank H, and connected by a pipe, J, with the pump-cylinder N, and I provide said pipe J with a check-valve, K, of any approved construction. The pump-cylinder N extends from the bottom of the tank H to the top of the same, and is provided with a piston, O, supported by the piston-rod extending through a partition, P', near the upper end of the cylinder end. In the lower end of the pump-cylinder N is held a valve, Q, above which opens the pipe J. In the extreme lower end of the cylinder N are formed the apertures N', for admitting the liquid in the tank H into the pump-cylinder N. In case the liquid leaks past the piston O the latter is moved into its uppermost position, so that when the liquid is again discharged into the tank through the apertures $N^2$, formed near the upper end of the pump-cylinder N, the latter can be closed at its outwardly-extending end by a cap, R, so as to prevent evaporation of the liquid. The discharge-pipe F extends from the four-way cock E upward through the tank H, and carries on its outer end a three-way cock, S, adapted to connect said pipe F with the discharge-pipe T, of any approved construction, and with the drip-pipe U, connecting said three-way cock S with the interior of the tank H, as illustrated in Fig. 6. The several positions of the three-way cock S are illustrated in Figs. 7, 8, and 9, and need no further description. The four-way cock E is operated from the outside of the tank H by having its stem connected with the rod E', the upper end of which passes through a stuffing-box, H', located in the top of the tank H. On the extreme outer end of the rod E' is formed a handle or lever, E², for turning said four-way cock into the respective positions above described, and illustrated in Figs. 2, 3, and 4.

The operation in this case is as follows: When the operator desires to discharge a certain amount of the liquid in the tank H, he removes the cap R from the pump-cylinder N and works the piston O by moving the piston-rod P up and down, so that the liquid in the tank H enters the pump-cylinder N through the apertures N', and then passes on the upward stroke of the piston O above the valve Q, and on the downward stroke of the piston O the valve Q is seated and the liquid is forced through the pipe J, passing the check-valve K, and finally enters the reservoir I, from which the liquid passes into the pipe G and into the four-way cock E, and through the same into one end of the cylinder A, in the same manner as above described. As soon as the piston C in the cylinder A is moved to one end by the entering liquid the operator turns the handle E², so that the four-way cock E is changed in the same manner as before described with reference to Figs. 1 and 2. The liquid then passes from the cylinder A through the pipe F and through the three-way cock S into the discharge-pipe T, and from the same into the desired receptacle. Upon the downstroke of the pump-piston the fluid is forced into the reservoir or chamber I. The air in said chamber is first compressed, and then acts by its tension or elasticity to force a continuous flow through the cylinder A and pipe T while the fluid is being drawn into the pump during the upstroke of the piston, thus insuring a continuous flow from the discharge-pipe T. The operation of the pump is continued and the four-way cock E is charged until the desired amount measured by the cylinder is discharged into the receptacle connected with the discharge-pipe T. The amount of liquid left above the three-way cock S can be returned into the tank A by moving the three-way cock S into the position illustrated in Fig. 8.

Having thus described my invention, what I claim as new, and desire to secure by Letters Patent, is—

1. In a fluid drawing and measuring device, the combination, with a tank, of a cylinder located in said tank, a piston operating in said cylinder, a four-way cock connected with the ends of said cylinder, and a pump located in said tank and connected by a pipe and intermediate chamber with said four-way cock, said pipe having a check-valve and said four-way cock connecting with a discharge-pipe, substantially as set forth.

2. In a fluid drawing and measuring device, the combination, with a tank, of a cylinder located in said tank, a piston operating in said cylinder, a four-way cock connected with the ends of said cylinder, a reservoir connected with said four-way cock, a pipe provided with a check-valve and connected with said reservoir, a pump connected with said pipe and located in said tank, and a discharge-pipe connected with said four-way cock, substantially as shown and described.

3. In a fluid drawing and measuring device, the combination, with a tank, of a cylinder located in said tank, a piston operating in said cylinder, a four-way cock connected with the ends of said cylinder, a reservoir connected with said four-way cock, a pipe provided with a check-valve and connected with said reservoir, a pump connected with said pipe and located in said tank, and a discharge-pipe connected with said four-way cock, substantially as shown and described.

4. In a fluid drawing and measuring device, the combination, with a tank, of a cylinder disposed in said tank, a piston operating in said cylinder, a four-way cock connected with the ends of said cylinder, a reservoir connected with said four-way cock, a pipe provided with a check-valve and connected with said reservoir, a pump connected with said pipe and located in said tank, a discharge-pipe connected with said four-way cock, a drip-pipe connecting with said tank and discharge-pipe, and a three-way cock applied to said discharge-pipe at the point of intersection therewith of the drip-pipe, substantially as set forth.

JOHN A. KENDALL.

Witnesses:
CHAS. E. MOSS,
L. L. MOSS.